April 21, 1959 W. C. BELK ET AL 2,883,078
APPARATUS FOR HANDLING BOXES
Filed Jan. 19, 1956 8 Sheets-Sheet 1

FIG_1

FIG_3

INVENTORS
WILBER C. BELK
HANS W. GROTEWOLD
BY Hans G. Hoffmeister
ATTORNEY

April 21, 1959 W. C. BELK ET AL 2,883,078
APPARATUS FOR HANDLING BOXES
Filed Jan. 19, 1956 8 Sheets-Sheet 2

FIG_2

FIG_4

INVENTORS
WILBER C. BELK
HANS W. GROTEWOLD
BY Hans G. Hoffmeister
ATTORNEY

April 21, 1959　　W. C. BELK ET AL　　2,883,078
APPARATUS FOR HANDLING BOXES

Filed Jan. 19, 1956　　8 Sheets-Sheet 7

FIG_12

INVENTORS
WILBER C. BELK
HANS W. GROTEWOLD
BY
ATTORNEY

April 21, 1959 — W. C. BELK ET AL — 2,883,078
APPARATUS FOR HANDLING BOXES
Filed Jan. 19, 1956 — 8 Sheets-Sheet 8

INVENTORS
WILBER C. BELK
HANS W. GROTEWOLD
BY *Hans G. Hoffmeister*
ATTORNEY

United States Patent Office 2,883,078
Patented Apr. 21, 1959

2,883,078
APPARATUS FOR HANDLING BOXES

Wilber C. Belk, Lakeland, and Hans W. Grotewold, Sebring, Fla., assignors to Food Machinery and Chemical Corporation, San Jose, Calif., a corporation of Delaware Application January 19, 1956, Serial No. 560,128

6 Claims. (Cl. 214—306)

This invention appertains to the art of handling boxes and more particularly relates to an improved apparatus for rotating boxes to dump the contents therefrom.

In the processing of fruit and vegetables for marketing it is often necessary to handle large quantities of loose product in bulk, as when a crop is harvested in the field and brought into a packing house or cannery. This handling is generally accomplished by placing the products in open top boxes from which they must be dumped when arriving at the point where the first step of the processing operation begins. The boxes are customarily brought from the field and placed on a conveyor which carries them into the plant. It is therefore an object of this invention to provide an efficient box handling device of the type referred to which is adapted to receive the boxes from the conveyor and dump the contents therefrom.

In many instances the boxes are brought from the field and placed on the delivery conveyor in stacks containing as many as four individual boxes arranged vertically one on top of another. Another object of the invention therefore is to provide a box handling device which is adapted to handle boxes fed thereto in vertical stacks as well as boxes fed individually.

Another object is to provide a box handling device wherein the delivery conveyor is automatically controlled to deliver the stacks of boxes or individual boxes in proper timed sequence with the operation of the box dumper, and wherein the box dumper will automatically stop upon failure of any boxes being delivered thereto.

Another object of the invention is to provide a box handling device of the type referred to wherein the empty boxes are discharged onto a conveyor in upright position.

Another object of the invention is to provide a box handling device that will dump the products from the boxes in a gentle manner, and which affords a minimum opportunity for the products to become bruised.

Various other objects of the invention will become apparent in reading the following detailed specification in conjunction with the accompanying drawings, wherein.

Figures 1, 3:
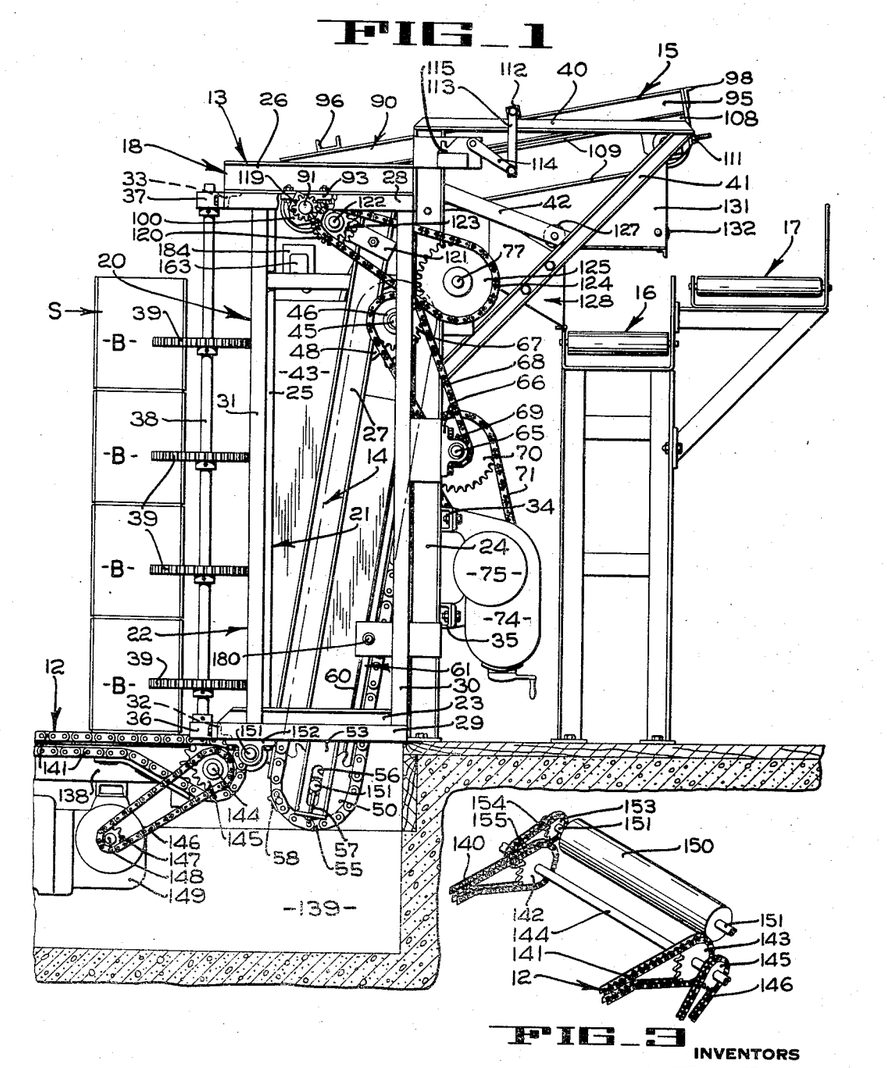
Fig. 1 is a side elevation of a box dumping machine embodying the principles of the invention.
Fig. 3 is a fragmentary perspective view illustrating a portion of the feed conveyor drive mechanism.

In Fig. 1 the reference numeral 12 indicates generally a stack feed conveyor which is arranged to carry a stack S of produce-carrying boxes B into the box dumping machine 13. While in the machine, the stack of boxes is raised upwardly by an elevating conveyor 14 to bring the topmost box into engagement with a continuously moving box turning mechanism 15 which tilts the box to dump the contents onto a produce conveyor 16 and then tumbles the empty box onto a box discharge conveyor 17.

Figure 2:
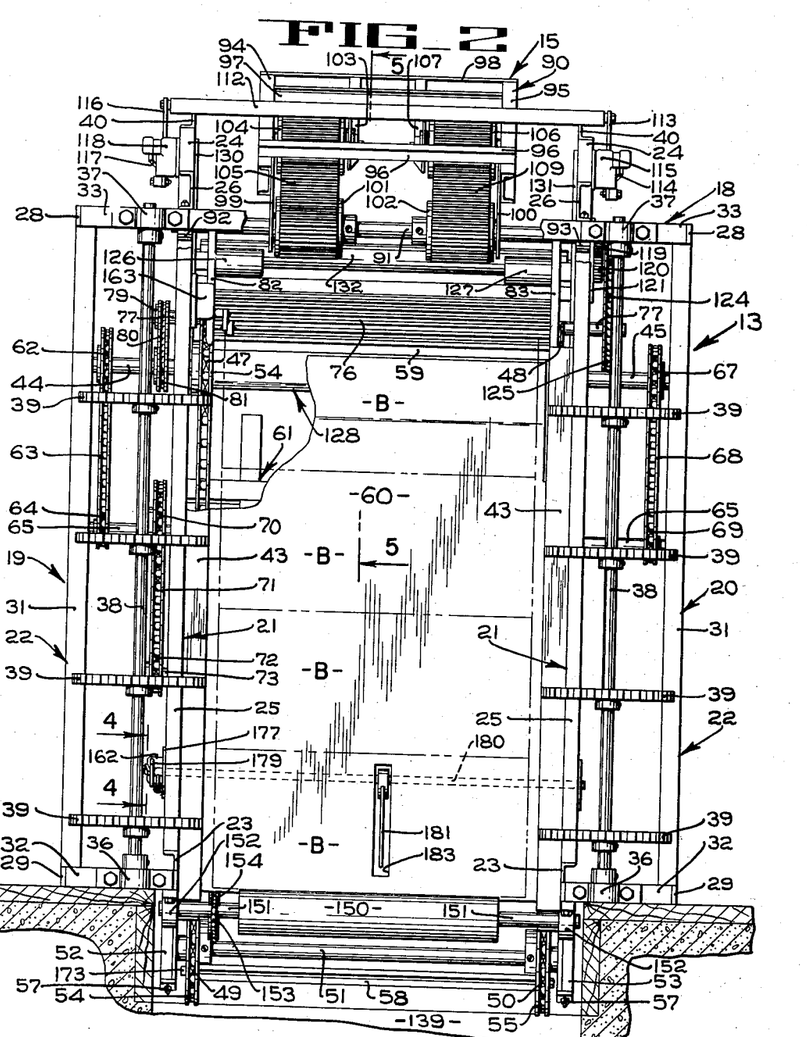
Fig. 2 is a front elevation of the box dumper shown in Fig. 1, with the box feeding conveyor omitted from the view to more clearly disclose the lower portion of the box elevating conveyor.

Referring now to Figs. 1 and 2 of the drawings, the reference numeral 18 indicates the box dumper support structure which has two side frames 19 and 20. Since the two side frames are substantially identical to each other, only the side frame 20 will be described in detail. It will be understood that the parts of the side frame 19 are similar, but oppositely disposed to the parts of side frame 20 and will be given identical reference numerals.

The side frame 20 comprises a rigid rectangular inner structure 21 and an outer structure 22. The inner structure 21 has a bottom horizontal channel member 23 adapted to be supported on the floor, and two parallel upright members 24 and 25 fixed to the ends of the member 23 and extending upwardly therefrom. The upper ends of the members 24 and 25 are connected by an upper horizontal channel member 26. An inclined stiffening channel 27 extends upwardly from the bottom member 23 adjacent the front upright 25 to the upper channel 26 adjacent the rear upright 24. The outer frame structure 22 is parallel to the inner structure 21 and is made of L-shaped angle members suitably secured together and comprises upper and lower horizontal members 28 and 29, respectively, and vertical members 30 and 31. A short member 32 (Fig. 2) connects the front end of the bottom member 29 of the outer frame structure 22 with the front end of the bottom member 23 of the inner frame 21. Similarly, a member 33 connects the front ends of the upper members 26 and 28, respectively. The member 33 extends completely across the machine in the manner shown in Fig. 2 and serves to connect the right and left side frames 19 and 20 together. A suitable cross brace (not shown) extends across the rear of the machine adjacent the bottom thereof and connects the rear ends of the members 29 and 23 of each of the side frames 19 and 20. Similarly, a short member (not shown) connects the rear ends of the upper members 28 and 26. Additional cross braces 34 and 35 (Fig. 1) are fixed to the rear uprights 24 of each of the inner frames and rigidly support the two side frame assemblies 19 and 20 relative to each other. Additional bracing between the two side frames 19 and 20 is provided by the several shafts extending therebetween, and journaled for rotation thereon, in the manner described hereinbelow.

At each side of the machine, a lower bearing 36 and an upper bearing 37 are fixed to the horizontal connector members 32 and 33, respectively, and rotatably support a vertical shaft 38. A plurality of large guide discs 39 are adjustably fixed to each shaft 38 at spaced points therealong and are adapted to contact the ends of boxes entering the machine and guide them into the machine between the side frames 19 and 20 thereof. Since the boxes enter the machine sideways, as shown in phantom lines in Fig. 2, the discs 39 will contact one of the end panels of each box that is out of vertical alignment with the rest of the boxes of the stack and will move the box inwardly toward an aligned position.

Also at each side of the machine, a triangular upper frame structure extends rearwardly from the inner side frame in the same plane therewith and comprises an upper member 40 (Fig. 1) fixed at its forward end to the upper end of the upright member 24. A diagonal member 41 connects the rear end of the member 40 with the member 24 adjacent the mid portion thereof. A second diagonal member 42 connects the mid portion of the member 41 with the member 24 adjacent the upper end thereof. Near the front of the machine, a side guide plate 43 is fixed to the rear edge of each of the two front uprights 25 and extends rearwardly and inwardly therefrom to act as an additional guide for boxes entering the machine.

The stack elevating conveyor 14 is mounted between the side frames 19 and 20. The stack elevating conveyor 14 comprises two stub shafts 44 and 45 (Fig. 2) each of which extends between the uprights 24 and 30 of one side frame. Each shaft is journalled in suitable bearings 46 (only one of which is shown in Fig. 1) which are fixed to the front face of the uprights 24 and 30, respectively, adjacent the upper end thereof. Sprockets 47 and 48 (Fig. 2) are keyed to the inner ends of the stub shafts 44 and 45, respectively. These sprockets are in vertical alignment with two sprockets 49 and 50, respectively, which are fixed to an idler shaft 51 rotatably supported between two brackets 52 and 53 fixed to the frame members 23 of the two side frames 19 and 20 and extending downwardly therefrom. An endless chain 54 is trained over the sprockets 47 and 49 on one side of the machine and a similar endless chain 55 is trained over the sprockets 48 and 50 at the other side. It will be noted that the shaft 51 extends through a slot 56 (Fig. 1) in the bracket 53 and through a similar slot (not shown) in the bracket 52, and that an adjusting means 57 is provided to move the shaft 51 along the slots to adjust the slack in the chains 54 and 55. Two box lifting flights 58 and 59 (Fig. 2) are fixed to and extend transversely between the chains 54 and 55. An inclined stack supporting plate 60 extends transversely of the machine between the side frame members 19 and 20 in parallel relation with and between the front and rear reaches of the elevating chains 54 and 55. The plate 60 extends upwardly and rearwardly from a point above the lower shaft 51 to a point slightly above the axis of the stub shafts 44 and 45, and is supported by a suitable strengthening frame 61 (Fig. 5) which is welded to the rear face of the plate 60 and is secured between the vertical side frame members 24.

The outer end of the stub shaft 44 (Fig. 2) is provided with a sprocket 62 connected by a chain 63 to a sprocket 64 keyed on one end of a shaft 65. The shaft 65 extends between the side frames 19 and 20 and is rotatably mounted in suitable journals 66, one of which is shown in Fig. 1. Similarly, the stub shaft 45 (Fig. 2) is provided at its outer end with a sprocket 67 connected by a chain 68 to a sprocket 69 fixed to the other end of the shaft 65. At the left side of the machine, a drive sprocket 70 is fixed to the shaft 65 and is connected by a chain 71 to a sprocket 72 fixed to the output shaft 73 of a variable speed gear reducing unit 74 mounted on the cross braces 34 and 35 in the manner shown in Fig. 1. An elevator drive motor 75 is fixed to and drives the gear reducing unit 74.

When each box reaches the upper end of the elevating conveyor, it passes over a fulcrum drum 76 (Fig. 2) which is fixed to a shaft 77 that extends transversely of the machine at the upper end of the guide plate 60 and is rotatably supported in suitable journals (not shown) fixed to the rear of the uprights 24 at a slightly higher elevation than the elevating conveyor stub shafts 44 and 45. The surface of the drum 76 is provided with a ribbed covering of rubber or similar material to form a box gripping surface thereon. A sprocket 79 is fixed to the left end of the shaft 77 and is connected by a chain 80 to a sprocket 81 keyed on the stub shaft 44, whereby the drum 76 is rotated in timed relation with the stack elevating conveyor chains 54 and 55. Two arcuate guide members 82 and 83 are mounted at opposite ends of the drum 76, one guide member being fixed to the inner side of each of the side frames 19 and 20. The center of curvature of said guides 82 and 83 is coincident with the axis of the drum 76 and the guides are spaced radially outwardly from the surface of the drum a distance equal to approximately one half the height of a box.

The box turning mechanism 15 is mounted above the fulcrum drum 76 and comprises a frame 90 that is pivotally mounted at its forward end on a shaft 91 which is rotatably supported by journals 92 and 93 (Fig. 2) fixed to the upper frame members 26 of the side frames 19 and 20, respectively. The frame 90 of the box turning mechanism comprises two parallel elongated channel members 94 and 95 connected together by transversely extending brace members as indicated at 96, 97 and 98. A bracket 99 is fixed to the forward end of the channel member 94 and extends downwardly therefrom and rotatably embraces the shaft 91. A similar bracket 100 is fixed to the forward end of the channel member 95 and extends downwardly therefrom in embracing relation with the shaft 91.

Two drums 101 and 102 are fixed to the shaft 91, one drum adjacent each of the channel members 94 and 95. Two spaced brackets 103 (only one being shown in Figs. 2 and 5) are fixed between the cross members 97 and 98 and extend downwardly therebeneath to journal the shaft of a drum 104 which is rotatably supported between the brackets in alignment longitudinally of the machine with the drum 101. A belt 105 is trained over the drums 101 and 104. Similarly, a drum 106 is rotatably supported between two spaced depending brackets 107 (Fig. 2) and 108 (Fig. 1) that are mounted in depending relation between the cross members 97 and 98. A second belt 109 (Fig. 2) is trained over the drum 106 and the drum 102 with which it is aligned. The outer surfaces of the belts 105 and 109 are ribbed or covered with an anti-friction material in the same manner as the surface of the drum 76. The journals for the shaft of the drum 104 are adjustable relative to the supporting brackets 103 by a take-up mechanism indicated at 110 (Fig. 5) to adjust the tension in the belt 105. A similar adjustment 111 (Fig. 1), associated with the shaft of the drum 106, permits adjustment of the belt 109. An angle brace 112 (Fig. 2) extends transversely of the members 94 and 95 and is fixed to the upper edges thereof adjacent their mid portions. A link 113 (Fig. 1) connects the right end of the brace 112 with an arm 114 of a shock absorber 115 which is secured to the side frame 20. Similarly, a link 116 (Fig. 2) connects the left end of the brace 112 with the arm 117 of a second shock absorber 118 fixed to the side frame 19.

The shaft 91 of the box turning mechanism 15 is provided at its right end with a spur gear 119 (Fig. 1) which is in mesh with a spur gear 120 freely journalled on a stub shaft 122 (Fig. 1) which is fixed in and projects away from a bracket 121 fixed to the upright 27 of the side frame 20. A sprocket 123, which is integrally formed concentrically with the gear 120, is connected by a chain 124 to a sprocket 125 fixed to the shaft 77, previously described. From the foregoing description, it is evident that regardless of the speed at which the machine is operated, the stack elevator chains 54, 55, the turning fulcrum drum 76, and the box turning belts 105 and 109 will all be operated in proper timed relation with each other since they are all driven from the same shaft 65.

It is particularly pointed out that the specific box turning mechanism 15 described herein is designed for use with citrus fruit boxes which have a central partition extending upwardly above the sides of the box. It is to be understood that when boxes not having such an obstruction are to be dumped, a single box turning belt centrally located between the members 94 and 95 may be employed in place of the two belts 105 and 109 described herein.

When a box B (Figures 5 and 6) is forced over the fulcrum drum 76 by the turning belts 105 and 109, it dumps its contents onto a chute 128 which is mounted between the diagonal frame members 41 of the triangular frame structures at the rear of the machine. The upper end of the chute 128 is adjacent the rear of the fulcrum drum 76 and the lower discharge end of the chute is arranged to deliver produce to the belt conveyor 16 which is suitably mounted transversely across the rear of the machine.

Figure 8:
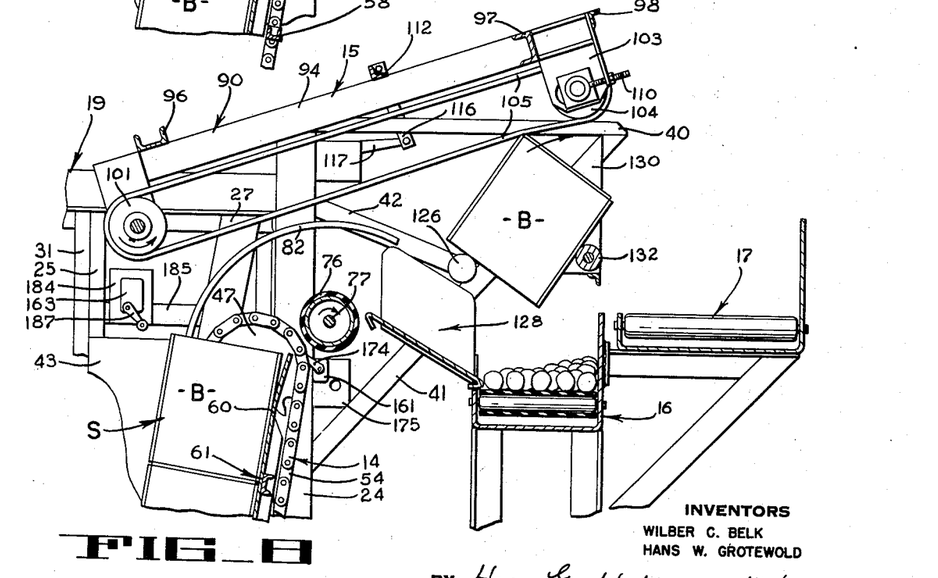
Figure 9:
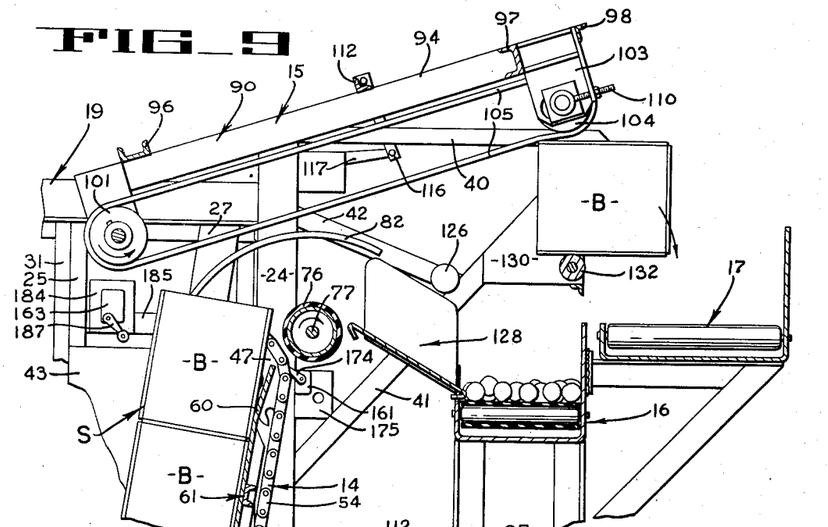

As the turning belts 105 and 109 continue to tumble the box B over the fulcrum roller, the edges of the panels of the box come into contact with a pair of non-rotatable stub shafts 126 and 127 (Figs. 1 and 5) each of which is fixed to a diagonal brace 42 of the rear triangular frame structure and extends inwardly into the path of movement of the boxes. As seen in Fig. 8, the box is tumbled over the stub shafts 126 and 127 by the belts and moved into contact with another fulcrum roller 132 that extends transversely across the path of the boxes and is rotatably journalled in a pair of guide plates 130 and 131, one of which is disposed on each side of the machine and is secured to a diagonal frame member 41. Continued movement of the turning belt tumbles the box B over the roller 132 and onto the box discharge conveyor 17 which is suitably mounted rearwardly and below the roller 132.

It should be noted that the elevating chains 54, 55, the fulcrum drum 76, and the box turning belts 105 and 109 are all interconnected by a common drive mechanism, whereby these elements are driven in a predetermined linear speed relation with each other so that there is a proper cooperation between the belts 105 and 109 and the drum 76 to carry the uppermost box of the stack away from the box next therebeneath and complete the dumping thereof prior to the time the next box contacts the belts 105 and 109.

Turning now to the stack feeding mechanism 12 which is best illustrated in Figs. 1 and 3, two parallel stack conveying chains 140 and 141, the upper reaches of which project slightly above the floor level, are trained over sprockets 142 and 143, respectively. The sprockets 142 and 143 are fixed to a common drive shaft 144 adjacent the front of the box dumping machine. The shaft 144 is rotatably journalled in a support structure 138 which is disposed in a pit 139 that is provided below the forward portion of the machine. The other ends of the stack conveying chains 140 and 141 are trained over suitable sprockets on an idler shaft (not shown) disposed in the pit 139 to the left of the machine as viewed in Fig. 1. A sprocket 145 (Fig. 3) is fixed to the right end of the shaft 144 and is connected by a chain 146 to a sprocket 147 (Fig. 1) fixed on a drive shaft 148 of a feed conveyor motor 149 mounted in the pit 139 on the support structure 138. A stack-tilting roller 150 (Fig. 3) is fixed to a shaft 151 rotatably mounted in suitable journals 152 (Fig. 2) fixed to the spaced frame members 23 of the side frames 19 and 20 adjacent the delivery end of the feed conveyor chains 140 and 141. The stack-tilting roller 150 is positively rotated by means of a sprocket 153 which is fixed to the left end of the shaft 151 and is connected by a chain 154 to a sprocket 155 fixed to the left end of the feed conveyor drive shaft 144, previously described. It will be evident that the stack of boxes is moved onto the rotating roller 150 by the stack feeding conveyor 12 and, since there is no support surface immediately in front of the roller, the stack will tilt and come to rest against the plate 60 to be engaged and elevated by a flight of the elevating conveyor.

Figure 11:
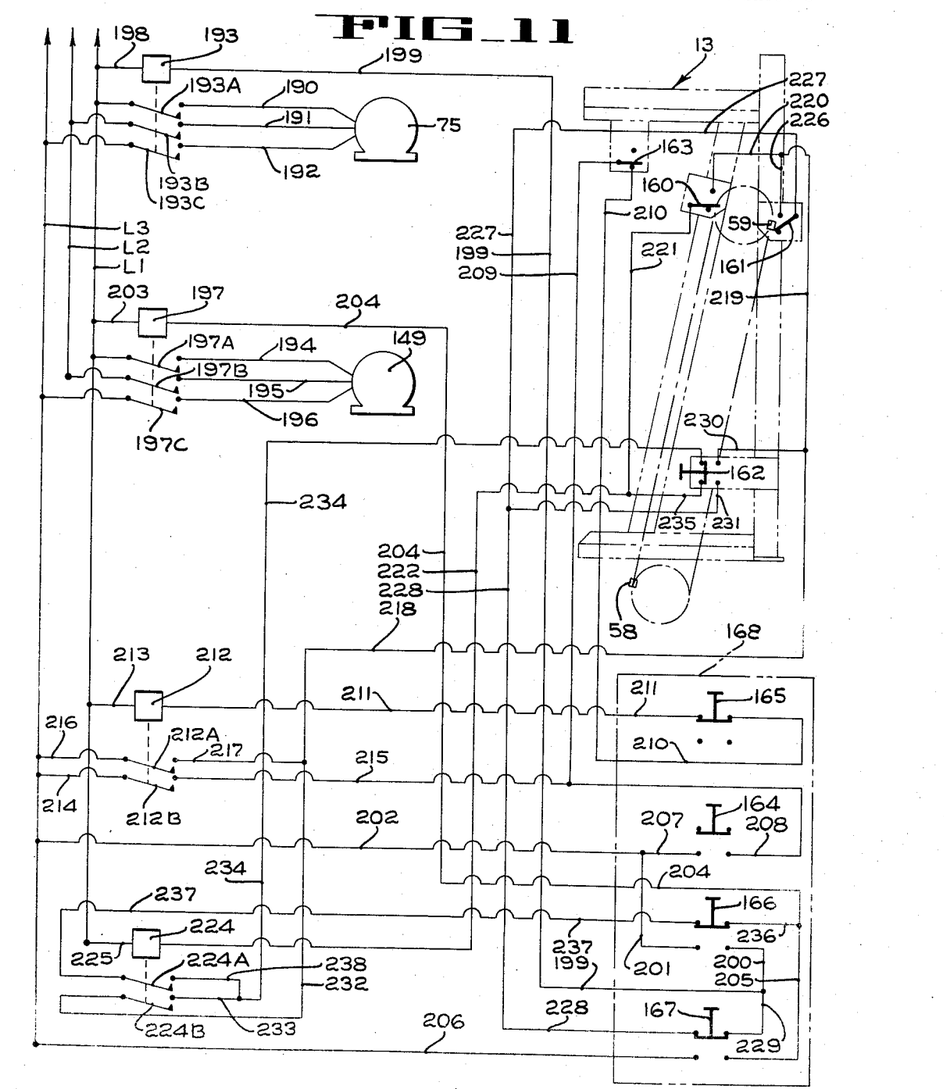
Fig. 11 is a wiring diagram of the electrical control circuit used in the machine, showing the inter-control between the elevating conveyor of the box dumper and the feed conveyor, the box dumper being shown schematically in dot-dash lines.

The electric circuit for controlling the operation of the present box dumping machine is illustrated diagrammatically in Fig. 11 wherein four switches 160, 161, 162 and 163 are illustrated as being mounted on the machine 13, which is shown in dot-dash lines, and four switches 164, 165, 166 and 167 are illustrated as being mounted on a control panel 168, which may be mounted on the machine or on a separate support.

Figure 6:
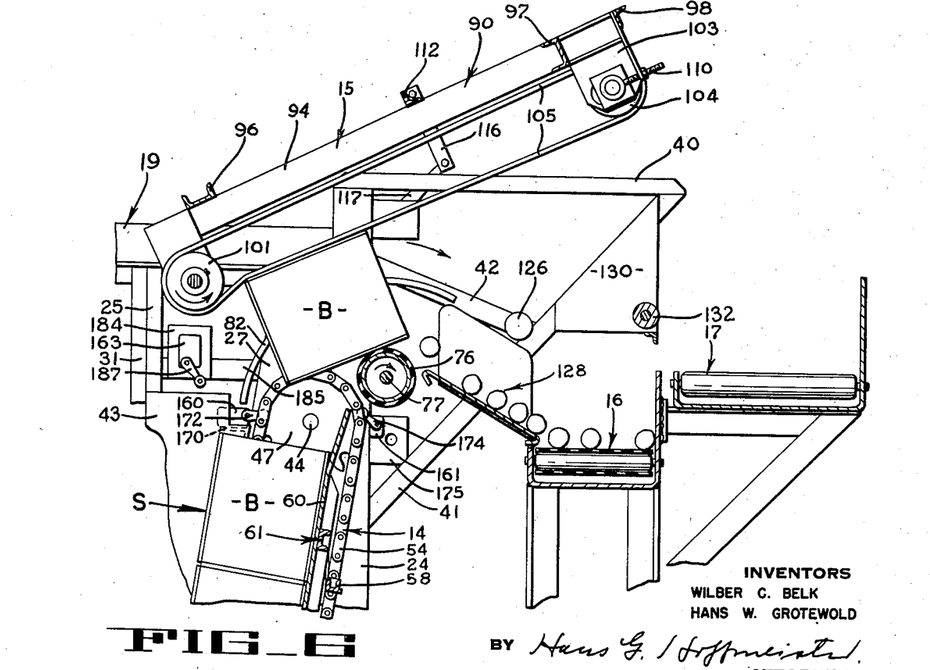

The switch 160, which is best seen in Fig. 6, is mounted on a bracket 170 secured to one of the inclined stiffening channels 27 of the frame. A switch actuating lever 172 extends into the path of lugs 173 (Fig. 2) carried on the left hand ends of the lifting flights 58 and 59 of the elevating conveyor 14. The switch 161 (Fig. 6) is mounted behind the elevating conveyor 14 on a plate 175 that is secured between the frame members 24 and 41. A switch actuating lever 174 extends into the path of the actuator lugs 173 on the lifting flights to be tripped thereby.

Figure 4:
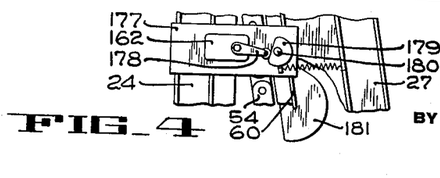
Fig. 4 is a fragmentary side elevation taken generally on line 4—4 of Fig. 2.

The switch 162, shown in Figures 2 and 4, is mounted on a bracket 177 secured to the vertical channel 24. A switch actuating lever 178 is arranged to be tripped by a cam 179 that is keyed to a shaft 180 which extends transversely of the machine behind the plate 60 against which the stack of boxes rests. The shaft 180 and the attached cam 179 are rotated by an arm 181 that is fixed to the shaft 180 and extends through a slot 183 in the plate 60 in position to be depressed by the stack of boxes as the stack comes to rest in inclined position on the plate 60.

The switch 163 (Fig. 5) is mounted on a plate 184 that is supported from a brace 185 extending between the frame member 25 and the channel 27. The switch 163 is located forwardly from the elevating conveyor so that the switch actuating lever 187 of the switch 163 is normally out of the path of the boxes moving upwardly along the inclined plate 60. However, if for some reason the stack of boxes is elevated before it assumes its normal inclined position, the uppermost box will contact and actuate the lever 187.

The switches 164 and 165, which are mounted on the control panel 168, are start and stop switches, respectively. The switches 166 and 167 are manually controlled jog switches whose function will be explained presently.

The three phase power input, indicated by $L_1$, $L_2$ and $L_3$ is connected to the three phase stack elevator conveyor motor 75 (hereinbelow referred to as the elevator motor) by the three leads 190, 191 and 192 through the contacts 193A, 193B and 193C of a relay switch 193, and to the three phase feed conveyor motor 149 (hereinbelow referred to as the feed motor) by three leads 194, 195 and 196 through the contacts 197A, 197B and 197C of a relay switch 197. The control circuits are single phase and are connected between the lines $L_1$ and $L_3$ in the manner described hereinbelow.

A lead 198 connects the coil of the relay switch 193 with the line $L_1$. The other side of the coil of the relay switch 193 is connected by leads 199 and 200 to one contact of a normally open pair of contacts of the two-position elevator jog switch 166. The other contact of said normally open pair of contacts is connected by leads 201 and 202 to the line $L_3$. Thus, as long as the jog switch 166 is held closed, the relay 193 will remain energized, causing the elevator motor 75 to operate.

One side of the coil of the relay switch 197 is connected to the line $L_1$ by a lead 203, and the other side is connected by leads 204 and 205 to one contact of a pair of normally open contacts of the two-position conveyor jog switch 167. The other contact of the normally open pair of contacts of the conveyor jog switch 167 is connected by a lead 206 to the line $L_3$. Therefore, as long as the jog switch 167 is held closed, the relay 197 will remain energized, causing the conveyor motor 149 to operate.

One side of the normally open start switch 164 is connected by leads 207 and 202 to the line $L_3$. The other side of the switch 164 is connected by leads 208 and 209 to one side of the normally closed safety stop switch 163. The other side of the switch 163 is connected by a lead 210 to one side of the normally closed stop switch 165. The other side of the stop switch 165 is connected by a lead 211 to one side of the coil of a control energizing master relay 212. The other side of the coil of the relay 212 is connected by a lead 213 to the line $L_1$. With this arrangement, when the start switch 164 is manually closed, the relay 212 is energized from $L_3$ through lead 202, lead 207, switch 164, leads 208 and 209, normally closed emergency switch 163, lead 210, normally closed contacts of stop switch 165 and leads 211, 213. When relay 212 is energized, contacts 212A and 212B are closed. The start switch 164 may then be released since relay 212 will remain energized through a holding circuit from $L_3$, through lead 214, contact 212B, leads 215, 209, closed switch 163, lead 210, closed stop switch 165, lead 211, and lead 213. Thus, after the master relay 212 is energized, it will remain energized until either the emergency switch 163 or the stop switch 165 is opened.

When the master relay 212 is energized, operating circuits are prepared through switches 160, 161 and the normally open contacts of two-position switch 162. The circuit prepared for the normally open switch 160 follows a path from $L_3$ through lead 216, relay contact 212A, leads 217, 218, 219, 220, 221 and 222, the coil of relay 224 and lead 225. The circuit prepared for normally closed switch 161 follows a path from $L_3$ through lead 216, relay contact 212A, leads 217, 218, 219, 226, 227, 228, the normally closed contacts of jog switch 167, leads 229, 199, the coil of relay 193 and lead 198. The circuit prepared for the normally open contacts of switch 162 follows a path from $L_3$ through lead 216, relay contact 212A, leads 217, 218, 230, 231, 228, the normally closed contacts of jog switch 167, leads 229, 199, the coil of relay 193, and lead 198.

The normally open switch 160 controls the energization of the conveyor motor 149. When a circuit is prepared through switch 160 by the energization of master relay 212, each time the switch 160 is momentarily closed by the lug 173 on the flight of the elevating conveyor, relay 224 will be energized and locked in through lead 216, contact 212A, leads 217, 232, contact 224B, leads 233, 234, normally closed contacts of switch 162, leads 235 and 222, the coil of relay 224 and lead 225. Energization of relay 224 causes the relay 197 to be energized, by a circuit which follows a path from $L_1$ through lead 203, the coil of relay 197, leads 204, 236, the closed contacts of jog switch 166, lead 237, relay contact 224A, leads 238 and 233, contact 224B, leads 232 and 217, contact 212A, and lead 216. With this circuit arrangement, the momentary closing of switch 160 energizes the conveyor motor 149 and the motor will continue to operate after the switch 160 closes due to the fact that the relay 224 is locked in through the normally closed contacts of switch 162 as mentioned above. Accordingly, the conveyor motor 149 will continue to operate until switch 162 is actuated by a stack of boxes entering the dumping machine.

The normally closed switch 161 controls the action of the elevator motor 75. As previously mentioned, when the master relay 212 is energized, a circuit is prepared through switch 161. Accordingly, when switch 161 is closed, this prepared circuit is energized, causing the energization of relay 193, which is connected in that circuit, whereby the elevator motor 75 is energized to start the stack elevator.

A bridging circuit between the contacts of switch 161 is provided by leads 226, 219, 230, normally open contacts of switch 162, leads 231 and 227. Thus, when the switch 161 is opened by the lug on the elevator, the elevator motor will be energized and will remain energized as long as a stack of boxes is lying against the arm 181 to close the normally open contacts of switch 162. If there is no stack of boxes disposed against the arm 181, the opening of the switch 161 will stop the elevator conveyor.

At the start of an operating cycle, the various electric switches and relays will be in the position shown in Fig. 11. It will be particularly noted that the normally closed switch 161 is held open by the lug on the flight 59 of the elevator conveyor. The start switch 164 is closed to energize the master relay 212 in the manner previously described. When the master relay 212 is energized, the circuits are prepared for the switches 160, 161 and 162 in the manner described above. The elevator jog switch 166 is now activated to move the elevator chains 54 and 55 a distance sufficient to move the lug on the flight 59 clear of the switch 161 and permit the switch to close so that the elevator conveyor will continue to run after the jog switch is released. When the flight 58 momentarily actuates the switch 160, the relay 224 is energized, and locked in through the normally closed contacts of switch 162 to start the conveyor motor 149, and cause the conveyor chains 140 and 141 to move a stack of boxes into the machine. When the stack reaches the transverse roller 150, the whole stack tilts about the axis of the roller until it is lying against the plate 60. The stack pushes against the arm 181 and actuates the switch 162 to break the normally closed connection therein and de-energize the relay 224 to stop the conveyor motor 149, and to close the normally open portion of the switch 162 to bridge the contacts of the switch 161 in the manner previously described whereby the elevator motor will continue to run even though the flight 58 now momentarily opens the switch 161. Meanwhile, the flight 59 engages the bottom of the lowermost box of the stack and raises the stack along the surface of the plate 60.

Figure 5:
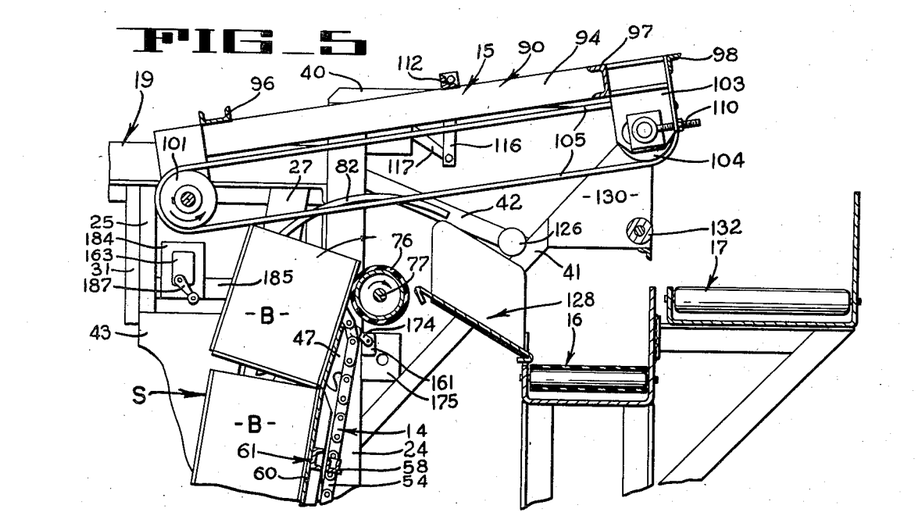
Figs. 5 to 10, inclusive, are fragmentary vertical sections taken on line 5—5 of Fig. 2 and illustrating the successive positions of a box being dumped by the machine.
Figure 7:
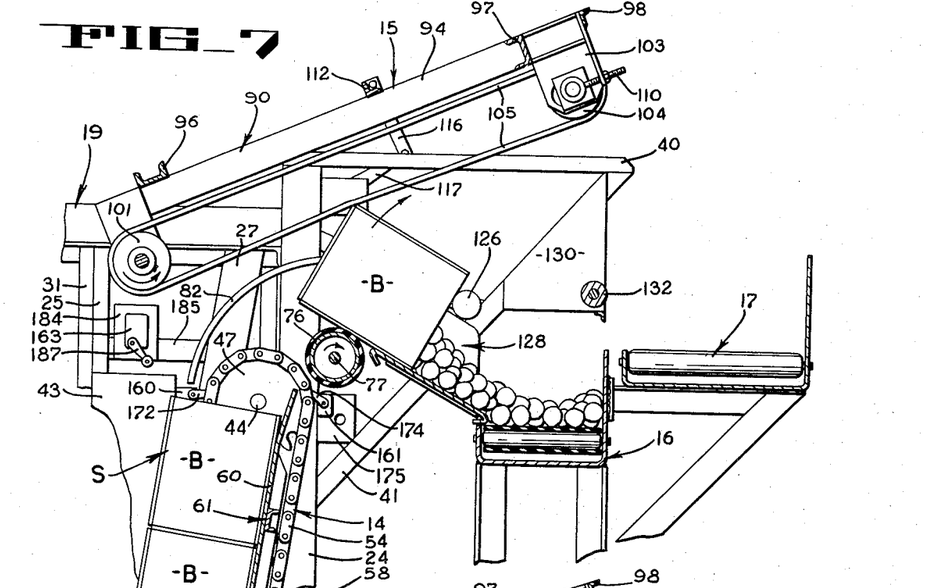

Referring now to Figs. 5 through 10, as the upper edge of the uppermost box reaches the belts of the turning mechanism 15 as shown in Fig. 5, the action of the belts and the fulcrum drum 76 turns the box about the axis of the drum, in the manner illustrated in Fig. 6, until the upper edge of the box strikes the aligned stub shafts 126 and 127. As illustrated in Fig. 7, the fruit or produce is dumped from the box onto the chute 128 and thence onto the produce conveyor 16. Further movement of the belts 105 and 109 rotates the box about the stub shafts 126 and 127, in the manner shown in Fig. 8, until the side of the box contacts the roller 132. The belts 105 and 109 then turn the box about the axis of the roller 132 in the manner shown in Fig. 9 and the box drops open end up onto the box discharge conveyor 17.

Figure 10:
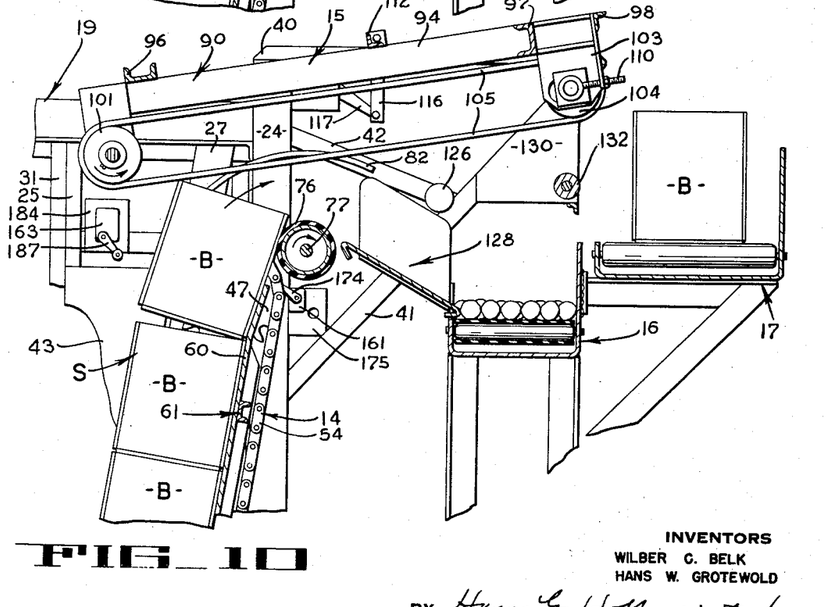

As the box is traveling through the dumper in the manner just described, the elevator motor 75 continues to run, and the succeeding boxes in the stack are being moved up to successively contact the belts 105 and 109. As can be seen in Fig. 10, the next box is just contacting the belts when the previous box drops onto the conveyor 17. After the last box of the stack has started through the dumping portion of the machine, the lug on the flight 59 of the elevator conveyor trips the switch 160 to start the conveyor to deliver another stack of boxes to the machine. Thus, it can be seen that once started, the machine will continue operating automatically as long as boxes are delivered thereto, and that when boxes cease to be delivered to the machine, the machine will automatically stop when the lug on the next flight of the elevator chains 54, 55 opens the switch 161.

The machine may be manually stopped at any time by depressing the stop switch 165 to deenergize the master relay 212, and similarly, if for any reason a stack of boxes fails to tilt against the plate 60 and is raised straight up, the uppermost box will strike the safety stop switch 163 and deenergize the relay 212 to stop the machine before the boxes jam against the box turning mechanism 15.

Turning now to the modification shown in Figs. 12, 13 and 14, the basic elements and control circuits are the same as those described in connection with Figs. 1 through 11 and therefore have been designated with the same reference numerals followed by a suffix "a." The main difference in this modification is that a flag assembly, generally indicated by the reference numeral 250 in Figs. 11 and 12, and has been added, and for reasons which will subsequently become apparent, the stub shafts 126 and 127 have been omitted.

The flag assembly 250 comprises two transversely spaced arms 251 (Figs. 12 and 13), the lower ends of which are fixed to a shaft 252 which is rotatably mounted in suitable journals 253 fixed to brackets 254 extending rearwardly from the upright frame members 24a. A shaft 255 connects the upper ends of the arms 251 and a flexible flag member 256 (Fig. 13) is fixed to the shaft 255 and extends downwardly therefrom. A backing member 257, somewhat less flexible than the flag 256, is fixed to the shaft 255 and extends downwardly therefrom adjacent the rear surface of the flag member 256. The backing member 257 is approximately one-half the length of the flag member 256.

Figure 12:
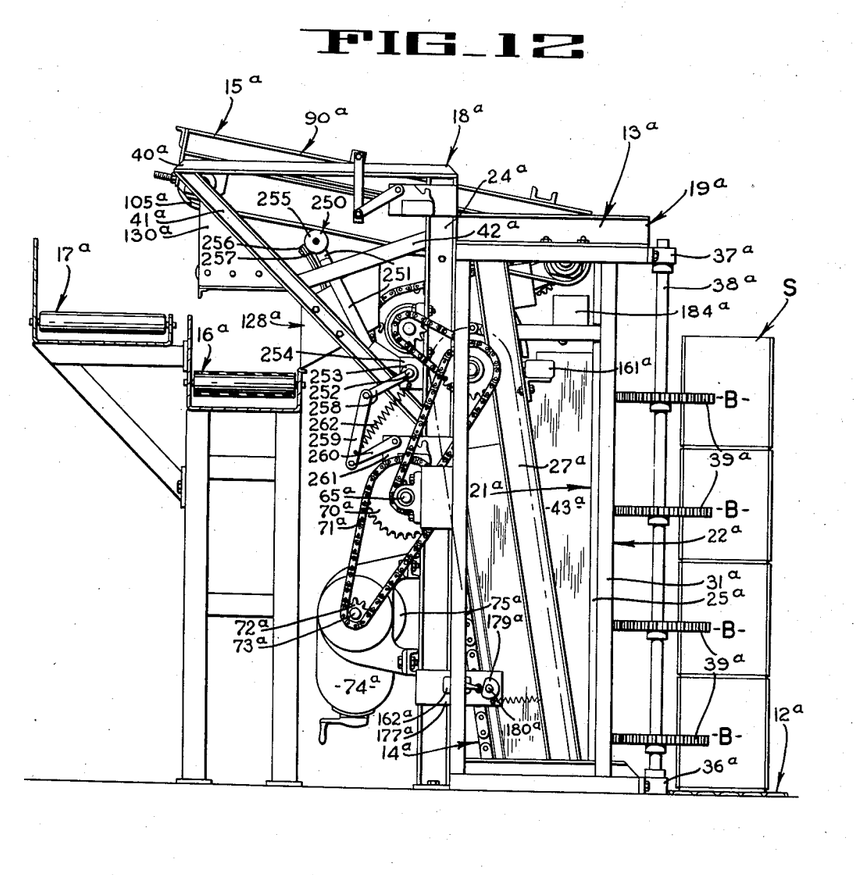
Fig. 12 is a side elevation of a modification of the box dumper of the present invention.
Figure 13:
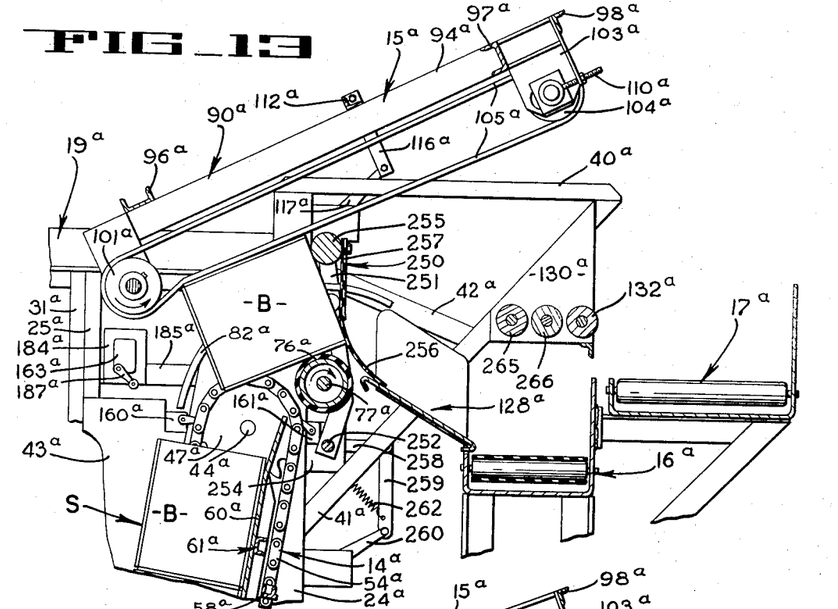
Figs. 13 and 14 are fragmentary schematic views of the modification shown in Fig. 12, and illustrate the action of the modified dumper.

As best seen in Fig. 12, the right end of the shaft 252 is provided with a rearwardly extending arm 258, the outer end of which is connected by a pivotal link 259 to the outer end of the arm 260 of a shock absorber mechanism 261 fixed to the side frame 19a. A similar linkage (not shown) connects the left end of the shaft 252 with a similar shock absorber (not shown) on the side frame 20a. A spring 262, connected between the lower end of the link 259 and the bracket 254, urges the arm 258 upwardly to rotate the flag assembly 250 in a counterclockwise direction about the axis of shaft 252 (as viewed in Fig. 13) so that the shaft 255 will contact the open end of a box being dumped, and the flag assembly 250 will lie in front of the open end of the box to cause the fruit to flow from the box along only the lower edge of the tilted box whereby to prevent bruising of the fruit.

Figure 14:
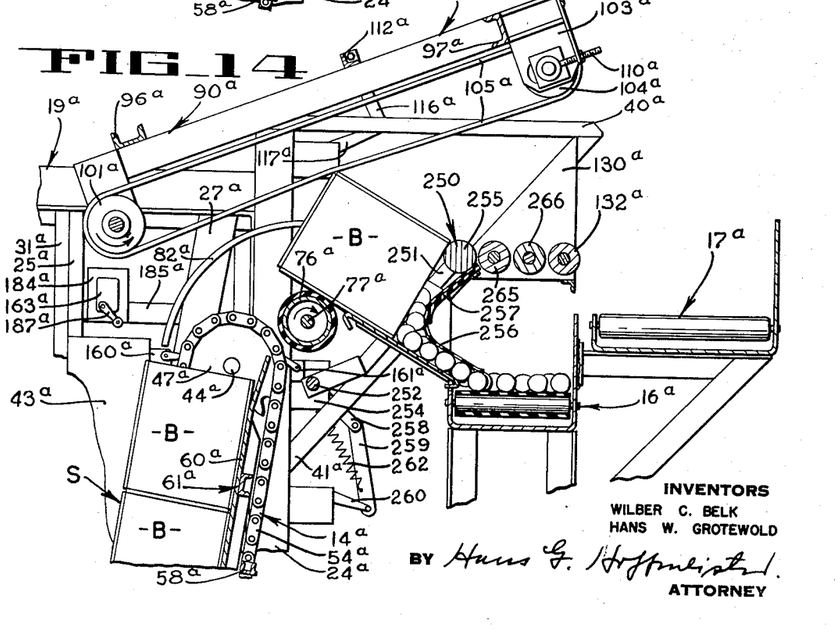

As can be seen in Fig. 14, the shaft 255 of the flag assembly 250 moves with the box about the axis of the shaft 252 until it reaches the position illustrated therein, which position corresponds to that formerly occupied by the stub shafts 126 and 127 in the embodiment of Fig. 1. When the shaft 255 is stopped in the position illustrated in Fig. 14, the belts 105a and 109a will rotate the box about said shaft and onto the rollers 265, 266 and 132a in inverted position. When the box passes over the roller 132a, it drops onto the discharge conveyor 17a on its side with the open end facing the front of the machine. The rollers 265 and 266 are removable, and if it is desired that the boxes issue right side up, these rollers are removed and the boxes will be tumbled as described in connection with Figs. 5 through 10. Similarly, if it is desired that the boxes issue on their sides from dumpers not equipped with a flag (such as that described in connection with Figs. 1 through 11), extra rollers similar to the rollers 265 and 266 may be inserted between the aligned stub shafts 126 and 127 and the roller 132.

While we have shown and described the preferred embodiments of our invention, it is obvious that various other changes may be made without departing from the spirit of the invention as defined in the appended claims.

Having thus described our invention, what we claim and desire to secure by Letters Patent is:

1. A box dumping device comprising a stack elevating conveyor, a power driven shaft rotatably mounted rearwardly of and adjacent to the upper end of said elevating conveyor, a relatively large diameter pivot drum fixed to said shaft for rotation therewith, the surface of said drum being covered with a box gripping material to prevent slippage between the boxes and said drum, a product discharge chute adjacent the rear of said drum, a box turning belt above said drum and said stack elevating conveyor and adapted to be contacted by the uppermost edge portion of the uppermost box of said stack and to cooperate with said power driven pivot drum to rotate said box about the axis of said drum upwardly and away from the succeeding box and into dumping relation with said chute, and means for driving said stack elevating conveyor, said drum shaft and said box turning belt in timed relation with each other.

2. A box dumping device comprising a stack elevating conveyor, a power driven shaft rotatably mounted rearwardly of and adjacent to the upper end of said elevating conveyor, a pivot drum fixed to said shaft for rotation therewith, a product discharge chute adjacent the rear of said drum, a box turning belt above said drum and said stack elevating conveyor adapted to be contacted by the uppermost peripheral edge portion of the uppermost box of said stack and to cooperate with said power driven drum to rotate said box about the axis of said drum upwardly and away from the succeeding box and into dumping relation with said chute, means for continuously driving said stack elevating conveyor, said drum shaft and said box turning belt in timed relation with each other, a pair of stub shafts extending parallel to the axis of said drum and spaced rearwardly from the surface thereof a distance slightly less than the width of said boxes, and a roller parallel to the axes of said stub shafts and spaced rearwardly from said shafts a distance slightly less than the height of said boxes.

3. A box dumping device comprising a stack elevating conveyor, a feed conveyor for delivering stacks of boxes to said elevating conveyor, a power driven shaft rotatably mounted rearwardly of and adjacent to the upper end of said elevating conveyor, a relatively large diameter pivot drum fixed to said shaft for rotation therewith, the surface of said drum being covered with a ribbed rubber box gripping material to prevent slippage between the boxes and said drum, a product discharge chute adjacent the rear of said drum, a box turning belt above said drum and said stack elevating conveyor adapted to be contacted by the uppermost edge portion of the uppermost box of said stack and to cooperate with said power driven drum to rotate said box about the axis of said drum upwardly and away from the succeeding box and into dumping relation with said chute, means for continuously driving said stack elevating conveyor, said drum shaft and said box turning belt in proper timed relation with each other, a pair of stub shafts extending parallel to the axis of said drum and spaced rearwardly from the surface thereof a distance slightly less than the width of said boxes, a roller parallel to the axes of said stub shafts and spaced rearwardly from said shafts a distance slightly less than the height of said boxes, and a box discharge conveyor mounted rearwardly of and slightly below said roller.

4. A box dumping device comprising a stack elevating conveyor, a feed conveyor for delivering stacks of boxes to said elevating conveyor, a power driven shaft rotatably mounted rearwardly of and adjacent to the upper end of said elevating conveyor, a relatively large diameter pivot drum fixed to said shaft for rotation therewith, the surface of said drum being covered with a box gripping covering to prevent slippage between the boxes and said drum, a product discharge chute adjacent the rear of said drum, a box turning belt above said drum and said stack elevating conveyor and adapted to be contacted by the uppermost edge portion of the uppermost box of said stack and to cooperate with said power driven drum to rotate said box about the axis of said drum upwardly and away from the succeeding box and into dumping relation with said chute, means for continuously driving said stack elevating conveyor, said drum shaft and said box turning belt in timed relation with each other, means for driving said feed conveyor, control means responsive to the action of said elevating conveyor to initiate action of said feed conveyor, means for stopping said elevating conveyor subsequent to the initiation of the action of said feed conveyor, means responsive to the delivery of a stack of boxes to said elevating conveyor to stop said feed conveyor and start said elevating conveyor, a pair of stub shafts extending parallel to the axis of said drum and spaced rearwardly from the surface thereof a distance slightly less than the width of said boxes, a roller parallel to the axes of said stub shafts and spaced rearwardly from said shafts a distance slightly less than the height of said boxes, and a box discharge conveyor mounted rearwardly of and slightly below said roller.

5. A box dumping device comprising a stack elevating conveyor, a power driven shaft rotatably mounted rearwardly of and adjacent to the upper end of said elevating conveyor, a relatively large diameter pivot drum fixed to said shaft for rotation therewith, the surface of said drum being covered with a box gripping material to prevent slippage between the boxes and said drum, a product discharge chute adjacent the rear of said drum, a box turning belt above said drum and said stack elevating conveyor adapted to be contacted by an upper portion of the uppermost box of said stack and to cooperate with said power driven drum to rotate said box about the axis of said drum upwardly and away from the succeeding box and into dumping relation with said chute, and a flag assembly adapted to contact the open end of said box as said box is rotated about said drum to control the flow of material from said box.

6. A box dumping device comprising a stack elevating conveyor, a feed conveyor for delivering stacks of boxes to said elevating conveyor, a power driven shaft rotatably mounted rearwardly of and adjacent to the upper end of said elevating conveyor, a relatively large diameter pivot drum fixed to said shaft for rotation therewith, the surface of said drum being covered with a rubber box gripping member to prevent slippage between the boxes and said drum, a product discharge chute adjacent the rear of said drum, a box turning belt above said drum and said stack elevating conveyor and adapted to be contacted by the uppermost edge portion of the uppermost box of said stack and to cooperate with said power driven drum to rotate said box about the axis of said drum upwardly and away from the succeeding box and into dumping relation with said chute, a flag assembly adapted to contact the open end of said box as said box is rotated about said drum to control the flow of material from said box, and means for continuously driving said stack elevating conveyor, said drum shaft and said box turning belt in proper timed relation with each other.

References Cited in the file of this patent
UNITED STATES PATENTS

| | | |
|---|---|---|
| 1,907,458 | Stevenson | May 9, 1933 |
| 2,517,956 | Albertoli | Aug. 9, 1950 |
| 2,612,277 | Verrinder | Sept. 30, 1952 |